Sept. 24, 1946.    W. R. PETERSON    2,408,225
VALVE BAG FILLING, WEIGHING AND DISCHARGING APPARATUS
Filed July 22, 1942    7 Sheets-Sheet 3
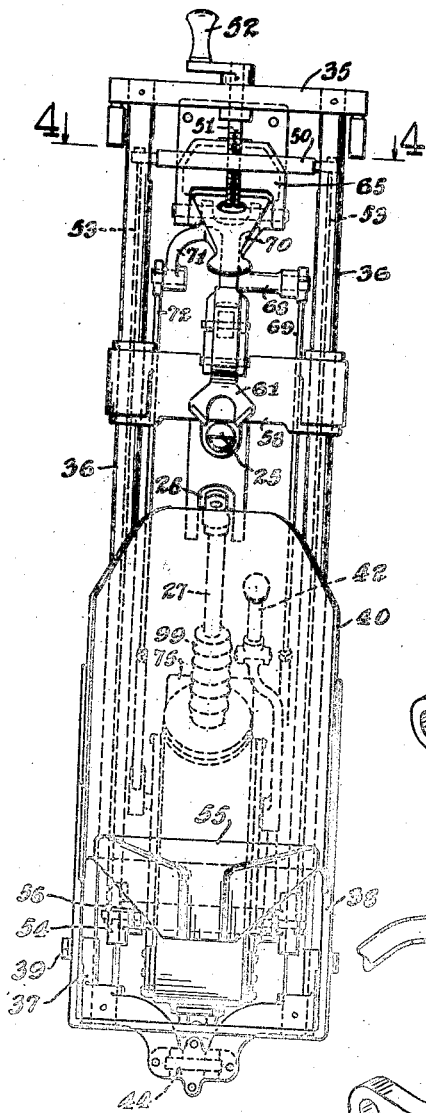
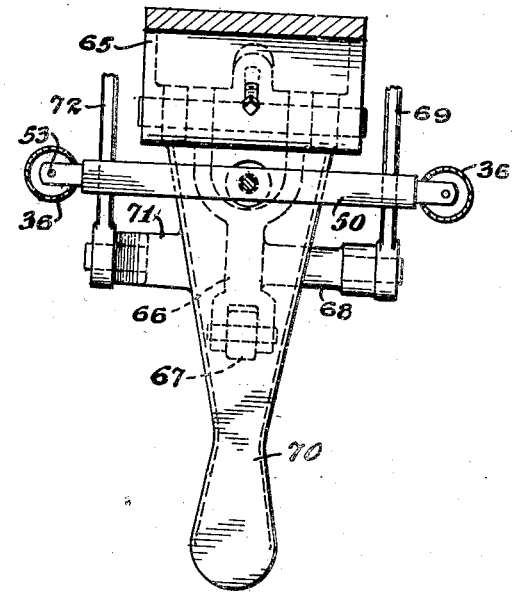
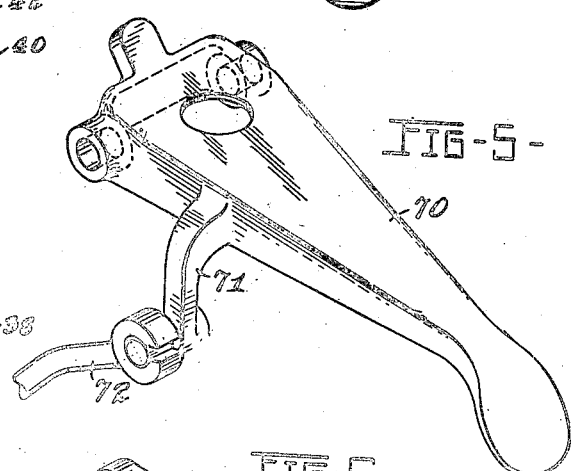
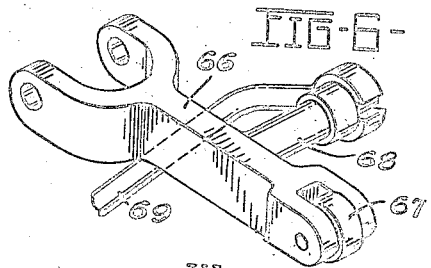
Inventor
WILLIAM R. PETERSON.
By Owen & Owen
Attorneys

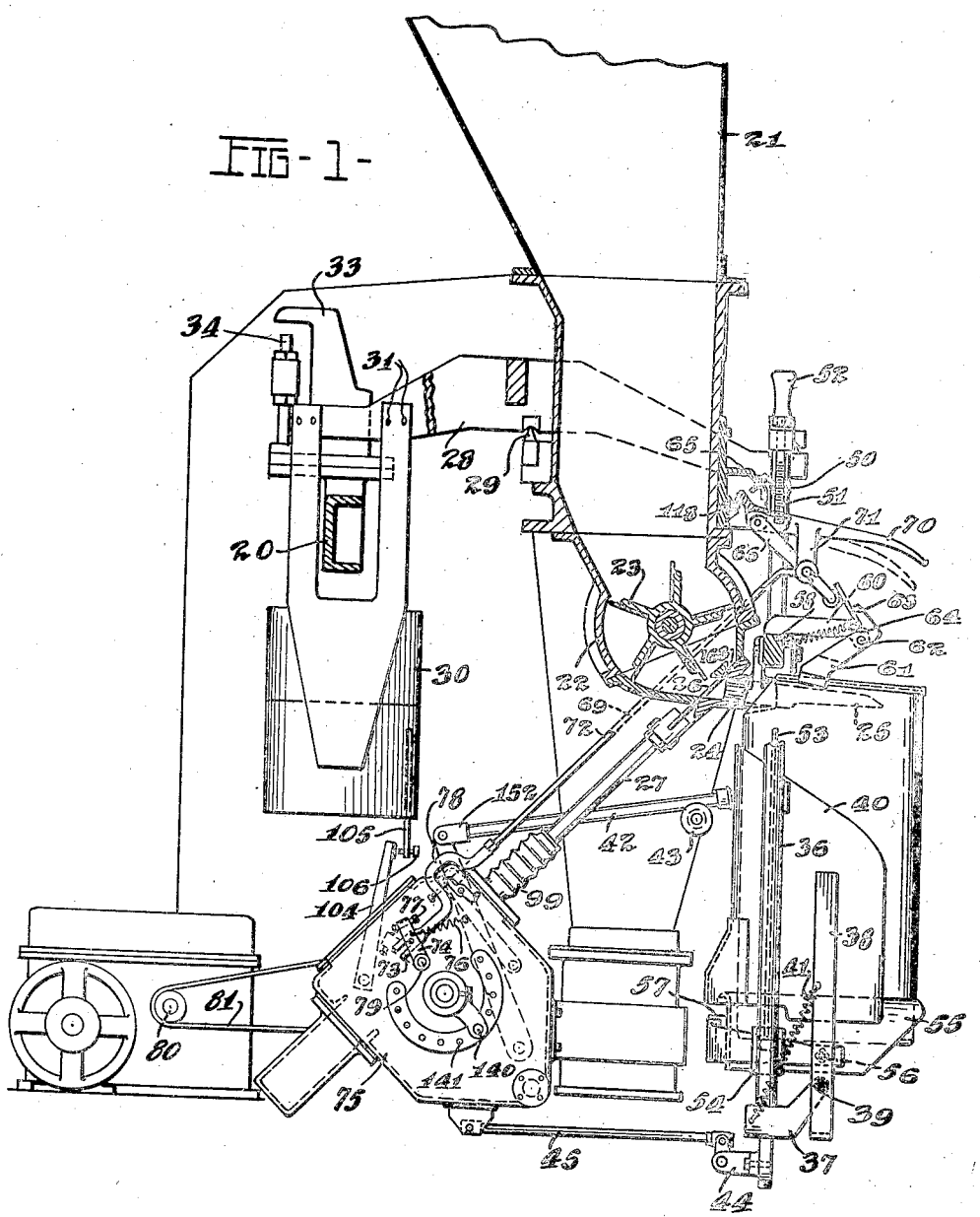

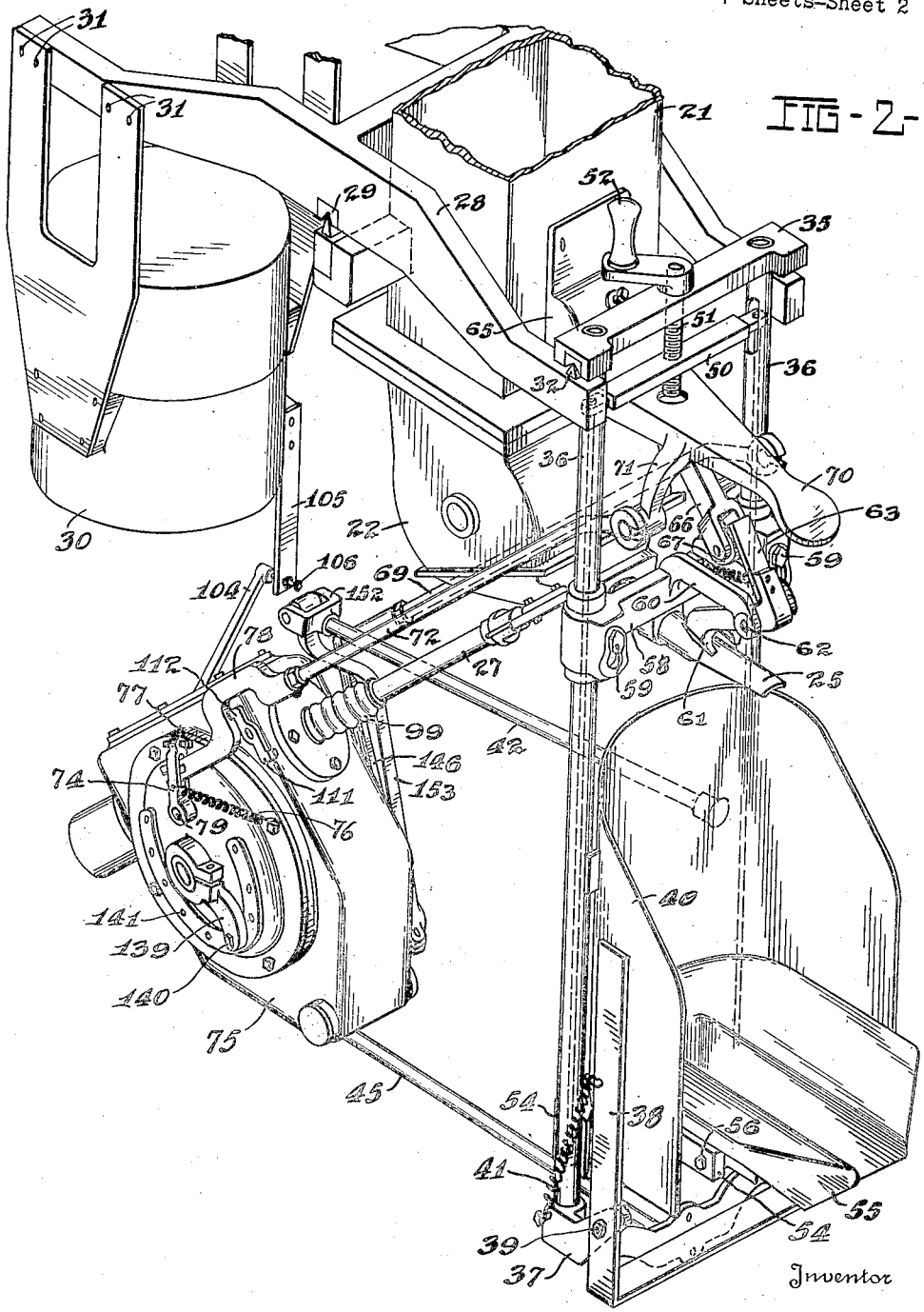

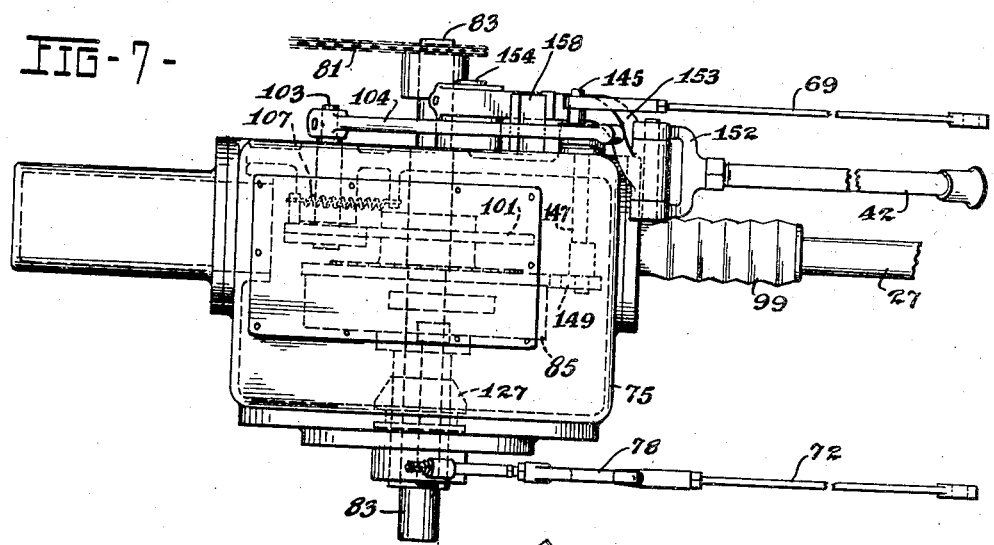
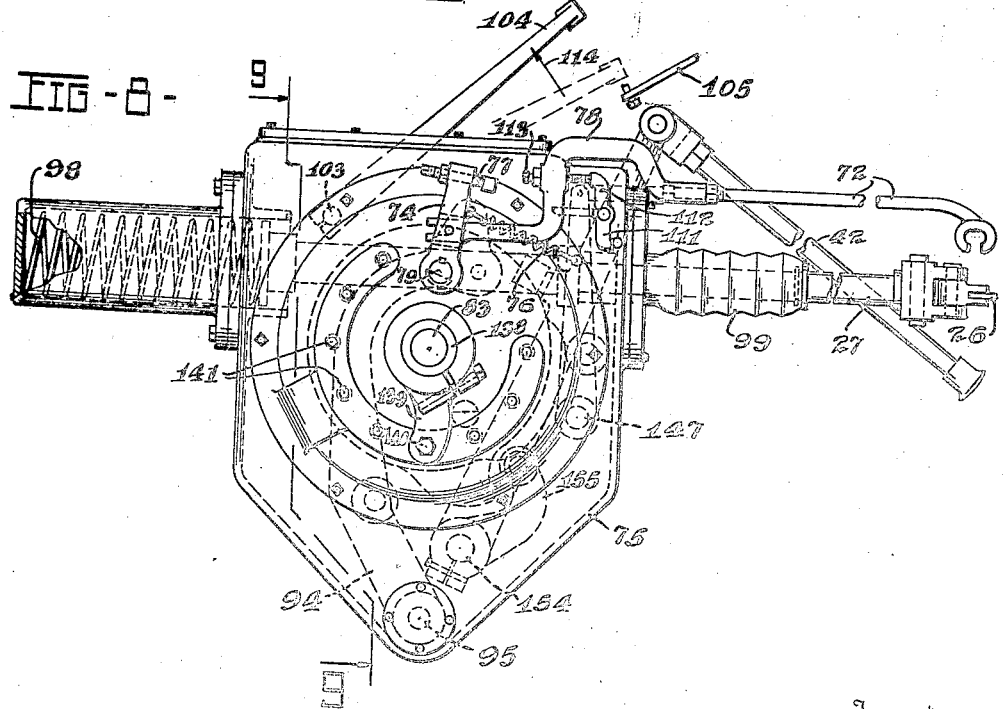

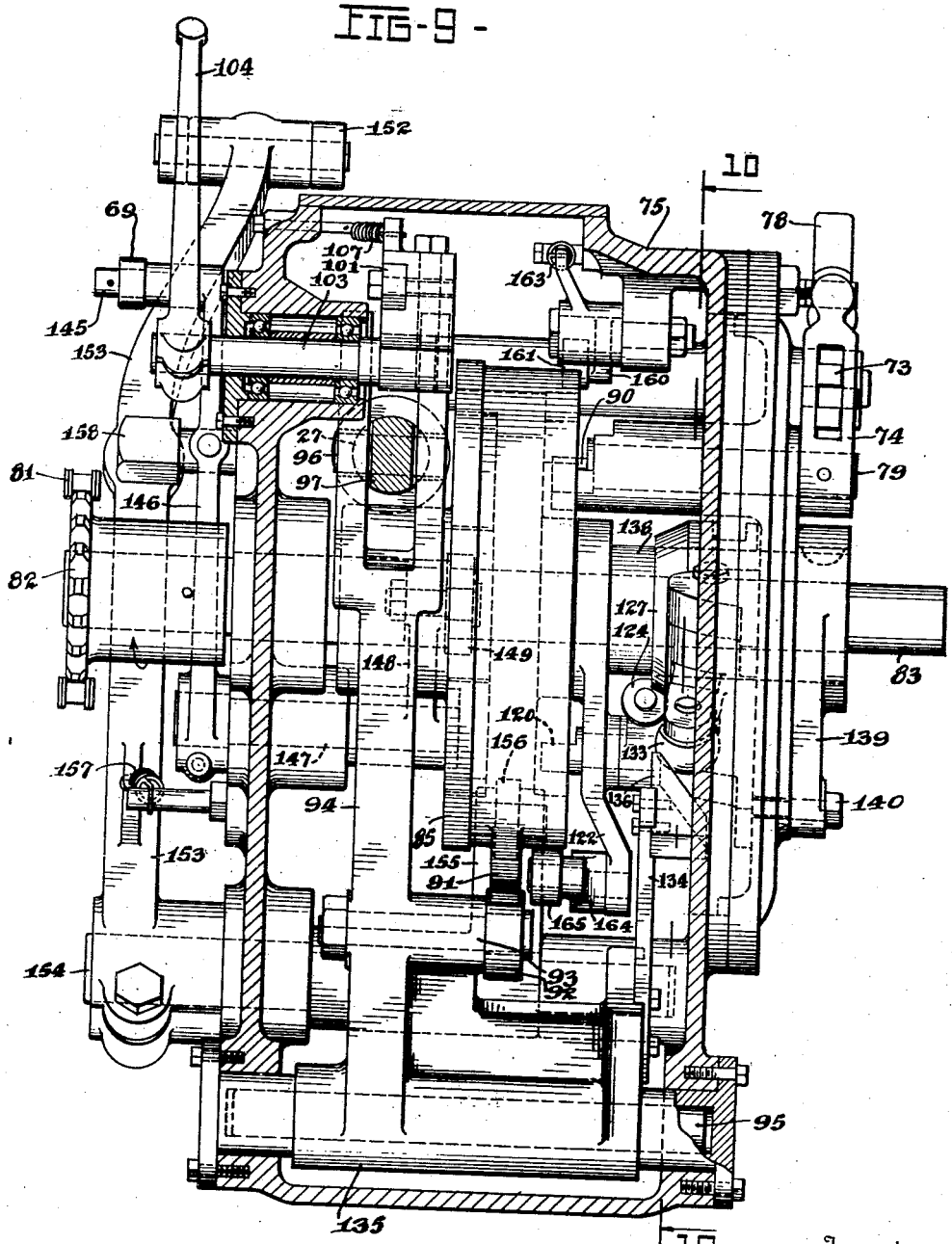

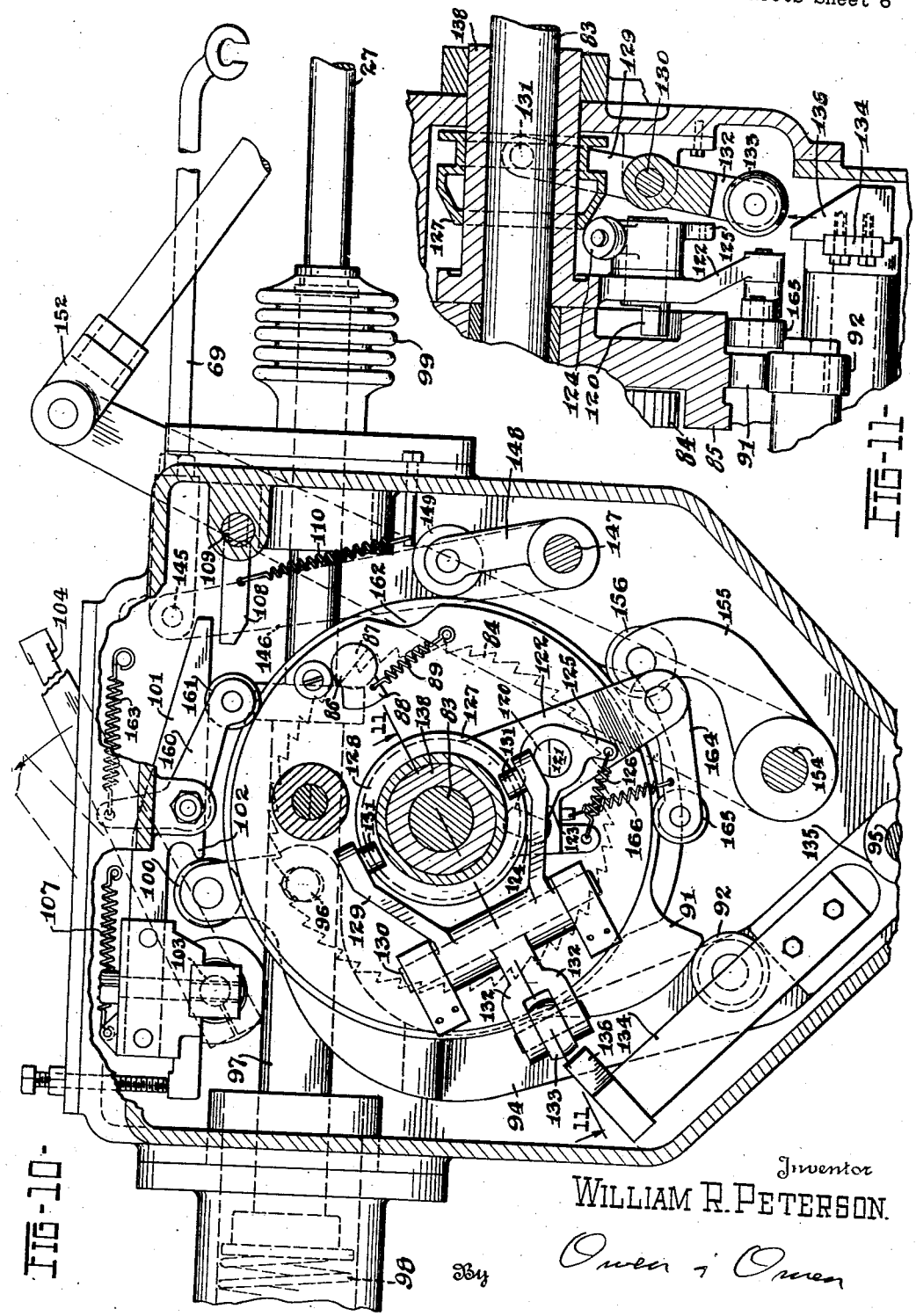

Sept. 24, 1946. W. R. PETERSON 2,408,225
VALVE BAG FILLING, WEIGHING AND DISCHARGING APPARATUS
Filed July 22, 1942 7 Sheets-Sheet 7
FIG-12-
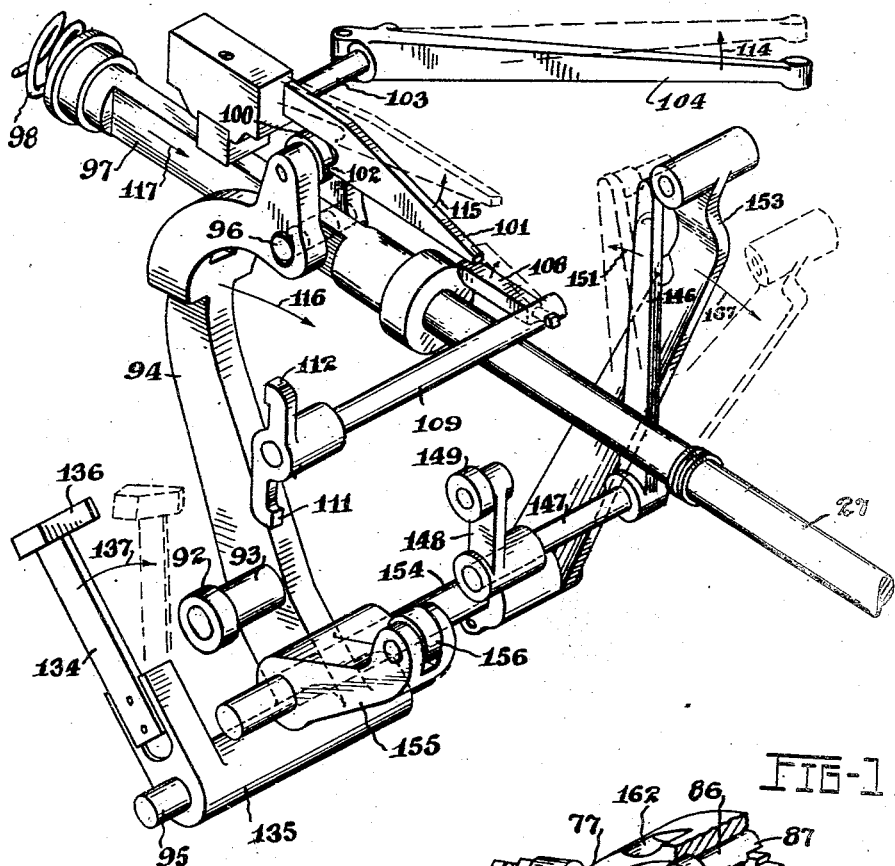
FIG-13-
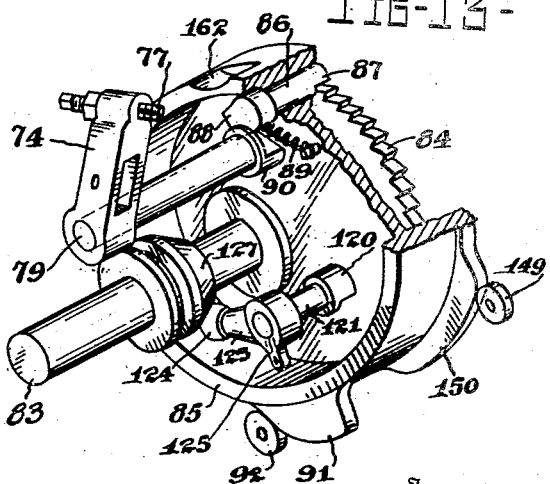
FIG-14-
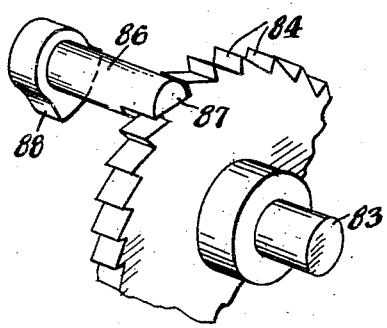
Inventor
WILLIAM R. PETERSON.
By Owen & Owen
Attorneys Patented Sept. 24, 1946

2,408,225

UNITED STATES PATENT OFFICE 2,408,225

VALVE BAG FILLING, WEIGHING, AND DISCHARGING APPARATUS

William R. Peterson, Oswego, N. Y., assignor to St. Regis Paper Company, New York, N. Y., a corporation of New York Application July 22, 1942, Serial No. 451,883

5 Claims. (Cl. 249—60)

1

This invention relates to apparatus for filling valve bags, simultaneously weighing the bags, and automatically discharging the bags when filled.

An object of the invention is to provide apparatus of the type described which will mechanically open the shut-off slide or gate, start the flow of material to the bag, when the bag has been placed in position and the apparatus tripped, and continue the filling and weighing operation automatically until the filled and weighed bag has been discharged and the apparatus is returned to position for receiving another empty bag.

Minor objects of the invention are to provide a new and improved arrangement for the shut-off slide or gate, provide new and improved operating mechanism for the gate, provide an improved adjustable bottom support for the bag, provide automatic means for releasing the bag clamp at the desired time, and provide automatic means for positively discharging the bag from filled position.

Minor objects and improvements will appear as the description proceeds.

In the accompanying drawings forming a part of this specification—

Figure 1 is a side elevation of one embodiment of the invention, with parts in section and with parts removed for clarity of illustration;

Figure 2 is an isometric elevation of the apparatus shown in Figure 1;

Figure 3 is a partial front elevation of the apparatus shown in Figure 1;

Figure 4 is a section on the line 4—4 of Figure 3;

Figure 5 is a detail view of a trip handle;

Figure 6 is a detail view of means for releasing the bag clamp;

Figure 7 is a plan view of the control unit viewed from the upper left hand side of the apparatus as shown in Figure 1;

Figure 8 is a side elevation of the control unit, with parts broken away;

Figure 9 is a section on the line 9—9 of Figure 8;

Figure 10 is a section on the line 10—10 of Figure 9;

Figure 11 is a section on the line 11—11 of Figure 10;

Figure 12 is an isometric view of certain of the operating rods and levers;

Figure 13 is a detail view of part of the clutch mechanism;

Figure 14 is another detail view of the clutch

2 mechanism from a different angle than Figure 13.

In my copending applications Serial No. 507,521, filed October 25, 1943, and Serial No. 667,418, filed May 4, 1946, there are disclosed and claimed other forms of machines having features which are common to that herein disclosed.

The apparatus embodying the invention is mounted upon suitable framework, some of which is shown as at 20 in Figure 1 and some of which is omitted in order to more clearly disclose the operating mechanism. The bag filling apparatus comprises a hopper 21 which may be connected with any suitable source of supply of cement or other material to be packaged. At the bottom of the hopper, there is a propeller housing 22 in which there is a constantly rotating propeller 23. At the right of the housing, as shown in Figure 1, there is a discharge opening 24 normally in alignment with a filling spout 25. The propeller is normally in continuous operation during the use of the mechanism, but discharge of material is cut off when desired by a suitable cut-off slide or gate 26. The gate is operated by a rod 27 in a manner which will be described later.

A double armed scale beam 28 is fulcrumed at 29 and carries a suitable weight 30 fixed to the scale beam, as shown at 31. It will be seen that the weight is rigidly fastened to the scale beam and, therefore, gives the scale beam a pendulum action. The front end of the scale beam is provided with pivots 32 for a load support, Fig. 2. A rigid stop member 33 projects from the frame over the rear end of the scale beam and an adjustable stop screw 34 mounted in the scale beam arms limits the height to which the rear end of the scale beam may rise and the frame member 20 as shown in Figure 1 limits the lowering of the rear end of the scale beam.

The load support comprises a top cross-piece 35 which rests upon the scale beam pivots 32. Depending from cross-piece 35, there are hollow supporting columns 36. The lower ends of the columns have attached thereto a bracket 37 to which a U-shaped member 38 is pivoted at 39. The U-shaped member 38 has attached thereto a bag shield 40 adapted to surround the sides and rear of a bag being filled upon the apparatus. A spring 41 normally holds the shield in upright position, as shown in Figures 1 and 2.

A discharge pusher rod 42 is supported at its front end upon a roller 43 and contacts shield 40, being operated to tilt the shield and discharge the bag in a manner which will be described later.

The bracket 37 has attached to the rear side thereof an arm 44 which is connected to a portion of the frame by a check rod 45 which operates parallel with the portion of the scale beam between pivots 29 and 32 so as to keep the load supporting rods 36 in upright position.

Beneath cross-piece 35, there is an adjusting cross-piece 50 which may be raised or lowered by a screw 51 operable by a handle 52. The ends of cross-piece 50 work in slots in hollow rods 36 and have attached thereto rods 53 which are within the hollow tubes 36. The lower ends of rods 53 have attached thereto, through slots in tubes 36, a bracket 54. A bottom support 55 for the bag is pivoted to bracket 54 at 56 (see Figure 3). The rear of the bottom support 55 is provided with a lug 57 which normally rests upon the bracket 54 and maintains the bottom support in the position in which it is shown in Figure 1.

A cross-piece 58 is secured at 59 to tubes 36. The filling tube 25 is secured to and supported by cross-piece 58.

Extending forward from the cross-piece 58, there is an arm 60. Bag clamp 61 is pivoted at 62 to arm 60. The clamp is provided with a tail piece 63 to which there is attached a spring 64 which normally presses the clamp down towards the filling tube.

Mounted on the front of the hopper, there is a bracket 65 (see Figure 1) to which there is pivoted a clamp releasing lever 66 (see Figures 1, 3 and 6). On the end of lever 66, there is a roller 67 in position to engage the tail piece 63 of the bag clamp. An arm 68 extends from lever 66 and is operated by a rod 69, the movement of which is controlled in a manner to be described hereafter.

Also mounted upon the same pivot in bracket 65 there is a trip handle 70 from which there extends an arm 71 engaging a connecting rod 72, Fig. 5. The lower end of the connecting rod is provided with a fork 73 which straddles a pin in a trip arm 74 on the control unit housing 75. A spring 76 normally pulls arm 74 to the right, as viewed in Figure 1, against an adjustable stop 77. Connecting rod 72 is provided with a bend 78 for a purpose which will be described later. The arm 74 is mounted upon a shaft 79 extending into the control unit housing and operable to trip the control clutch, as will be described later.

A suitable source of power 80 is provided to drive a belt or chain 81, which operates a sprocket 82 upon a shaft 83 mounted in the housing 75 (see Figures 1, 7 and 9). Rigidly mounted on shaft 83 within the housing there is a toothed clutch wheel 84 (see Figure 13). Mounted loosely upon shaft 83, there is a cam carrier or drum 85. A clutch pin 86 is mounted in the cam carrier 85 and is oscillatable so that its flattened end 87 may be engaged with or disengaged from the toothed wheel 84. The opposite end of pin 86 is provided with an arm 88 normally urged by a spring 89 into clutch-engaging position. On the end of shaft 79, mentioned above, there is a stop member 90. When the parts are in the position in which they are shown in Figures 1 and 13, the stop member 90 engages arm 88 and oscillates pin 86 so as to disengage the clutch. It will be seen that when trip handle 70 is lowered, the shaft 79 is oscillated sufficiently to release arm 88 and allow the clutch to become engaged.

Cam carrier 85 is provided with a cam 91, which upon movement of the cam carrier, engages a roller 92 on an arm 93, attached to a lever 94 pivoted at 95 and connected at 96 to a flattened portion 97 of the gate controlling rod 27. At the rear lower end of rod 27, there is a strong spring 98 which is compressed when cam 91 forces lever 94 to the left as viewed in Figure 10, for example. This forcing of the rod 27 downward and to the left opens the gate and allows material to be discharged by the propeller to the filling spout into a bag that has been previously placed thereon.

In order to prevent entrance of dust into the housing of the control unit, a boot 99 of rubber or the like is attached at one end to the housing and at the other end to rod 27.

At the upper end of lever 94 there is provided a roller 100. When the lever is moved to the left as shown in Figure 10, a latch 101 drops downward and a tooth 102 of the latch engages the roller. The latch is pivoted at 103. Mounted upon the same pivot there is a trip arm 104 which extends upward, as shown in Figures 1 and 2. Attached to the weight carrier 30 there is a downwardly extending arm 105 having at the end thereof an adjustable screw 106 in position to contact the end of trip arm 104 when the weight end of the scale is raised and swings to the left, as viewed in Figure 1. It will be seen that when the weight moves about fulcrum 29, the movement of screw 106 will be more nearly horizontal than vertical and so will engage the end of trip arm 104 and raise latch 101 against the tension of spring 107.

In the normal operation of the machine, after the gate has once been opened and latched in the open position by the means just described, it remains open until the bag is filled sufficiently to cause movement of the scale beam, resulting in movement of arm 104 to release the latch. However, in order to close the gate promptly in case of any emergency where the bag was not being properly filled, there is provided a manual means for releasing latch 101 at will. Beneath the right end of the latch, as viewed in Figure 10, there is an arm 108 on a rockshaft 109. Normally the arm 108 is held in the position in which it is shown in Figure 10 by means of a spring 110. Rockshaft 109 extends outside of the control unit housing and has mounted thereon outside the housing a stop arm 111 and an actuating arm 112, Fig. 8. A screw 113 is mounted in the bend 78 of rod 72. Normally trip handle 70 at the upper end of rod 72 would remain in the position in which it is shown in Figure 1 due to its own weight, but there is provided also in bracket 65 a compression spring 118 which insures that normally the fork 73 will rest in the lowest position permitted by arm 74. However, as hereinafter described, when it is desired to close the gate or shut-off slide in an emergency, trip handle 70 may be raised sufficiently to operate arm 112 and rockshaft 109 so as to lift the end of latch 101.

In Figure 12, there is shown the relation of a number of the operating parts free from the actuating means so that their connections may be more easily understood. It will be seen from examination of this figure that when arm 104 is moved in the direction indicated by arrow 114 by the operation of the scale beam, latch 101 is moved in the direction indicated by arrow 115 and this allows lever 94 and gate controlling rod 27 to be moved in gate-closing position by spring 98 in the direction indicated by arrows 116 and 117.

When the clutch is allowed to close by movement of trip handle 70 in the manner described above, the drum or cam carrier 85 will continue to move until arm 88 encounters a timing stop 120 on the end of a pin 121 which is mounted in an arm 122. On the other end of pin 121 there is an arm 123 carrying a cam roller 124. Another arm 125 on the end of pin 121 is connected to a spring 126 which urges the pin in a direction to move roller 124 towards shaft 83. Slidable longitudinally of shaft 83 there is a conical cam member 127 having therein a groove 128. A forked lever 129 is fulcrumed at 130 and has pins 131 entering the groove in cam 127. Lever 129 also has an operating arm 132 carrying a roller 133. An arm 134 is mounted on the sleeve 135 which carries lever 94. A cam 136 on the end of arm 134 engages the roller 133 when the arm 134 is moved in the direction of the arrow 137 on Figure 12, at the same time that lever 94 is moved in the direction of the arrow 116.

A sleeve 138 is provided between shaft 83 and the conical cam 127 and arm 122 is mounted upon the inner end of this sleeve 138. The sleeve extends outside of the housing of the unit control and has attached thereto an arm 139 which is held in adjusted position by a pin 140 which may enter any one of a plurality of holes 141 arranged in an arc on the outside of the housing. In this way the stop 120 may be adjusted through approximately 240° to stop the cam drum at the desired time after movement thereof has been initiated by the rocking of shaft 79.

A pin 145, Fig. 10, extending through the end of rod 69 connects that rod to a clamp-operating lever 146. This lever is mounted upon a rockshaft 147. Another arm 148 on the rockshaft carries a roller 149 which is engaged at the proper time by a cam 150 on the cam carrier. The cam 150 is so positioned upon the cam carrier that it engages roller 149 only shortly before the completion of a cycle of movement of the unit when arm 88 again engages stop 90. Arrow 151 on Figure 12 indicates the movement of the arm 146 and consequently movement of rod 69 when the roller 149 is not in engagement with cam 150, which is the greater part of the time. When the arm 146 is in the position indicated by dotted lines in Figure 12, it will be readily seen that the clamp controlling member 66 will be lowered sufficiently to allow spring 64 to close the clamp upon a bag positioned on the filling tube 25.

At the rear end of push rod 42, there is a fork 152 connected to a rock arm 153 extending from rockshaft 154. Upon the other end of the rockshaft, there is an arm 155 carrying a cam roller 156. This may be operated by a separate cam on the cam carrier if desired, but in the construction shown, it is arranged to be operated by the same cam 91 which operates lever 94. It will be readily seen from a comparison of Figures 12 and 13 that after the clutch has made one complete revolution and is in the stop position, cam 91 has operated upon roller 156 and is in position to move roller 92 immediately upon closing of the clutch. A spring 157 normally retracts pusher rod 42 and holds the rock arm 153 against a stop 158 (see Figure 9).

The cam drum is held in proper stop position while not engaged by the clutch by the following means. A bell crank lever 160 carries on one arm a roller 161 adapted to enter a notch 162 in the cam drum (see Figure 10). The other end of the bell crank lever is connected to a spring 163 which holds the roller against the drum with sufficient force to hold the drum against accidental movement. On arm 122 there is a link 164 carrying a roller 165 which is pulled by a spring 166 into notch 162 when the drum reaches the second stop position.

It is believed that the operation of the apparatus will be fairly obvious from the foregoing description, but for convenience the entire cycle may be briefly reviewed.

The apparatus being in the stop position, as indicated in Figure 13, the shut-off slide or gate 26 will be closed. The valve of a valve bag is threaded upon the filling spout 25. Thereupon, the source of power 80 being effective, the operator moves trip handle 70 downward to the dotted line position indicated in Figure 1 whereupon, through the connecting rod 72 and arm 74, the shaft 79, Figs. 1 and 13, is rocked so as to cause stop 90 to release arm 88 of clutch pin 86 with resultant engagement of the clutch pin end 87 with the rotating clutch wheel 84. When the trip handle 70 is moved down as described above, it is held only momentarily and, therefore, it immediately returns to the full line position thereof shown in Fig. 1. This happens by reason of the fact that the spring 76, which biases trip arm 74 in a clockwise direction against the stop 77, is stronger than the spring 118. If desired, a spring, not shown, may be provided to assist spring 76 in performing the function stated. When trip arm 74 returns to its position against the stop 77 as last described, the stop 90 returns to its normal position where it is effective to discontinue operation of the unit after completion of one cycle of operation thereof.

Upon the engagement of the clutch, rotative movement of the carrier 85 in a clockwise direction, Fig. 13, is initiated with the result that cam 150 moves from beneath roller 149, as will be apparent from Figure 13, this allowing the movement of arm 146 in the direction indicated by arrow 151 in Figure 12, and the consequent lowering of rod 69 (which is connected to arm 146, Fig. 10) and arm 66, Fig. 1. As a result, the spring 64 becomes effective to cause the clamp 61 to clamp the bag upon filling spout 25. Substantially simultaneously cam 91 moves roller 92 and lever 94 so as to move the slide controlling rod 27 downward and compress spring 98 with the result that the gate 26 is opened. When cam 91 actuates lever 94 as last described, the latch 101 coacts with the roller 100 thereof to retain said lever 94 in the position shown in Fig. 10 after movement of the cam 91 beyond roller 92. The material is then at once discharged into the bag by the constantly rotating propeller 23. While the material continues to be discharged into the bag, the cam drum continues movement without other operating effect until the arm 88 of the clutch pin 86 moves into engagement with the stop 120, Fig. 13, to disengage the clutch tooth end 87 from the clutch 84. As a result, the cam carrier 85 is disconnected from the clutch wheel 84 and said cam carrier 85 becomes stationary.

Normally, the material will be fed into the bag until it counterbalances the scale weight sufficiently to swing screw 106 to the left, as viewed in Figure 1, to operate trip arm 104 and thereby release the gate controlling rod 27 for closing movement in response to the action of spring 98. This action occurs by reason of the fact that operation of the trip arm 104 raises the latch 101, Fig. 12, whereby the lever 94 swings clockwise, Fig. 12, with resultant movement of said rod 27 as described to close the gate 26. Member 134 moves when the lever 94 swings clockwise as described immediately above, Figs. 10 and 12, and cam member 136 engages roller 133 to move the conical cam 127 from right to left, Fig. 11. The latter engages roller 124 whereby, through the described mechanical connection, the stop 120 moves free of the arm 88 of the clutch pin 86 and the clutch tooth end 87 reengages the toothed wheel 84. The cam carrier 85 now resumes rotation with the toothed wheel 84. During this period, air escapes from the filled bag to avoid the puff of dust-laden air.

Thereafter, the cam carrier 85 continues to move with the toothed wheel 84 until it is disconnected therefrom in the manner hereinafter described and, preferably, the timing is such that an appreciable length of time elapses before such disconnecting operation is effected. Eventually, however, the cam 150 engages roller 149 and, through the described mechanical connection, the arm 66 is moved upwardly, Fig. 1, to thereby open the bag clamp 61 against the action of spring 64. Immediately thereafter, the cam 91 engages roller 156, Fig. 10, which effects the rocking of arm 153 in the direction indicated by arrow 167 on Figure 12 or clockwise, Fig. 10, whereby the rod 42, Fig. 1, is actuated to tilt the shield 40 and discharge the filled bag therefrom in the manner hereinafter described. After completion of the foregoing, the arm 88 of clutch pin 86 moves into engagement with stop member 90 (which was returned to normal position in the manner described above) to disengage the clutch pin 86 from the toothed wheel 84. As a result, rotary movement of the cam carrier 85 ceases and one cycle of operation is completed. At any desired time, the trip handle 70 may be moved momentarily upwardly, against the action of spring 118, from the full line position thereof shown in Fig. 1. When this is done, a portion of the bend 78 of rod 72 engages arm 112 to move shaft 109 and arm 108 in a clockwise direction, Fig. 10. As a result, latch 101 is raised, Fig. 12, with resultant closing of the gate 26 in the manner hereinbefore described. The last described operation of trip handle 70 may be effected upon occurrence of some abnormal operation, such as the tearing of a bag, etc.

By swinging arm 139 to the desired position and inserting pin 140 into the proper hole 141, the distance that the cam drum travels, after the clutch is closed by movement of the scale beam, can be adjusted. Where a large amount of air is fed into the bag along with the filling material, a delay between the closing of the cut-off slide or gate and the discharge of the bag allows the air to escape gradually before the bag is removed from the filling tube. This tends to avoid the puff of dust-laden air that would otherwise be discharged through the valve opening upon removal of the filling tube from the opening. The mechanism disclosed permits the interposition of sufficient delay, but also permits shortening the interval to what is necessary or desirable under the particular circumstances.

The particular mounting of the bottom support for the bag allows of the accurate adjustment of the height of the support, without interrupting the operation of the filling device, to give the degree of support desired, both during filling and discharging. This positions the support at exactly the right distance from the filling spout to give the necessary support to obviate tearing of the top of the bag where it is threaded onto the filling tube and at the same time avoid holding the bag bottom so high that there is any interference with proper filling. When shield 40 is moved by pusher 42, it shoves the bag off of the filling tube while the bottom of the bag rests upon the horizontal bag support. After the bag moves far enough so that its center of gravity is in front of pivot 56, the bottom support tilts with the bag and allows the bag to slide off.

The pendulum action of the scale results in an even and controlled movement of the scale beam as the predetermined weight of material is fed into the bag, and the relatively great distance of trip-adjusting screw 106 from fulcrum 29 makes possible a very fine adjustment of the trip so that the feed may be shut off at exactly the chosen position of the scale beam.

The gate or cut-off slide may be of any usual or desired type, but the disclosed construction is preferred. It will be noted that the upper end of the slideway is closed to the outer air, but is open at 168 into the propeller housing. This prevents escape of dust from the slide way into the open air, but at the same time allows the edge of the gate to force any dust before it from the slideway back into the housing, so that movement of the slide is not blocked by material packed in the end of the slideway. The angle of opening 168 is such that the propeller does not pack material tightly in that opening.

While one embodiment of the invention has been described in considerable detail, it will be understood that various changes may be made within the scope of the appended claims. For example, compressed air in the cylinder enclosing spring 98 could be used instead of the spring to close the gate, and other obvious changes might be made. Also, while the entire combination as disclosed has been found to work together advantageously to constitute a desirable filling machine, it will be understood that a number of the features might be incorporated separately in filling devices of the same general type and retain some of their advantages.

For example, the arrangement is advantageous whereby trip handle 70 is held normally in a middle position by spring 76 holding it up as far as permitted by stop 77 and spring 118 preventing its unintentional movement upward from that position, since this enables the intentional downward movement of the handle to start the filling operation while the upward movement of the handle may be employed as an emergency stop. While this obviously cooperates with other disclosed features, the idea might be employed with quite different operating mechanisms. Other similar examples will be clear in view of the appended claims.

What I claim is:

1. In apparatus for filling and discharging receptacles, means for feeding material to a receptacle, a one-revolution clutch, manual means for closing the clutch, means responsive to the operation of said clutch for initiating the feed of material to the receptacle, adjustable means for opening the clutch during the course of its one revolution, weighing means, means responsive to the action of said weighing means for stopping the feed of material to the receptacle and reclosing the clutch, and means actuated and timed by the clutch for discharging the receptacle near the completion of the one revolution of the clutch.

2. In valve bag filling apparatus comprising a filling tube adapted to enter the valve of a bag and a gate controlling the flow of material to the tube, a one-revolution clutch, manual means for closing the clutch, connections opening the gate by the initial movement of the closed clutch, adjustable means for opening the clutch at a selected point in its revolution, means to close the gate, means rendered operable by the closing of the gate to reclose the clutch, and means rendered operable by the clutch near the completion of its one revolution to discharge the bag.

3. In valve bag filling and weighing apparatus comprising a filling tube adapted to enter the valve of a bag, a weighing device for weighing a bag being filled through the tube and a gate for shutting off the flow of material to the tube, a one-revolution clutch, manual means for closing the clutch, connections opening the gate by the initial movement of the closed clutch, adjustable means for opening the clutch at a selected point during its revolution, means controlled by the weighing device for closing the gate, means controlled by the weighing device for reclosing the clutch, and means rendered operable by the clutch immediately before the conclusion of the one revolution of the clutch to discharge the bag from the tube.

4. In valve bag filling and weighing apparatus comprising a filling tube adapted to enter the valve of a bag, a weighing device for weighing a bag being filled through the filling tube, a gate for shutting off flow of material to the tube, a spring urging the gate toward closed position, a latch for holding the gate open and means releasing the latch in response to weighing movement of said device, a one-revolution clutch, manual means for closing the clutch, connections opening the gate by the initial movement of the closed clutch, adjustable means opening the clutch at a selected point during its revolution, means rendered operable by the closing of the gate for reclosing the clutch, and means rendered operable by the clutch immediately before the conclusion of the one revolution of the clutch to discharge the bag from the tube.

5. In valve bag filling apparatus comprising a filling tube adapted to enter the valve of a bag, a clamp for holding a bag on the tube, a one-revolution clutch, manual means for closing the clutch, connections for closing the clamp by the initial part of the one-revolution, means to open the clutch at an intermediate point in its one revolution, means to reclose the clutch when the bag is filled, and connections to the clutch releasing the clamp immediately before the conclusion of the one revolution.

WILLIAM R. PETERSON.